United States Patent [19]

Henderson

[11] 4,367,397
[45] Jan. 4, 1983

[54] ELECTRIC WORK-IN-CIRCUIT METAL-BONDING TONGS

[76] Inventor: Harry J. Henderson, 1914 N. Tenth St., Fargo, N. Dak. 58102

[21] Appl. No.: 196,166

[22] Filed: Oct. 14, 1980

[51] Int. Cl.³ .................... B23K 3/04; B23K 9/28; H05B 3/02
[52] U.S. Cl. .................. 219/234; 219/85 D; 219/90; 219/230
[58] Field of Search ............... 219/234, 90, 85 D, 230

[56] References Cited

U.S. PATENT DOCUMENTS

| | | | |
|---|---|---|---|
| 916,140 | 3/1909 | Fulton | 219/85 D |
| 2,844,697 | 7/1958 | Emmerson | 219/234 |
| 3,510,623 | 5/1970 | Wulgast | 219/234 X |
| 3,924,332 | 12/1975 | Rauch et al. | 219/234 X |

FOREIGN PATENT DOCUMENTS

| | | | |
|---|---|---|---|
| 911957 | 4/1946 | France | 219/234 |
| 1117852 | 3/1956 | France | 219/90 |
| 537136 | 6/1973 | Switzerland | 219/234 |
| 562602 | 7/1944 | United Kingdom | 219/234 |

*Primary Examiner*—A. Bartis
*Attorney, Agent, or Firm*—Ralph F. Staubly

[57] ABSTRACT

An electric work-in-circuit tool has a pair of fiber-reinforced plastic arms connected in tong fashion and limitedly opened by a spring. The free end of each arm has an integral flange apertured to receive bolts for assembling with, and attaching to the arm, a plurality of centrally apertured metal discs which are spaced by metal washers to form a heat-dissipating unit. The heat-dissipating unit spacedly surrounds the rear part of a metallic conductor body which has an axial bore to receive the bared end of an insulated power supply conductor passing axially through each tong arm. The conductor body also has a reduced-diameter front extension supportingly received in either a longitudinal or a transverse bore in the rear end of a metallic electrode holder whereby the electrode holder may be oriented either longitudinally or transversely of the conductor body. Each electrode holder has a longitudinally extending rabbited seat for dove-tailed slidable reception of a tapered carbon electrode-block. A handle-mounted micro-switch is positioned, as for thumb operation, to control the low-amperage high-voltage circuit to a step-down transformer for supplying a low-voltage high-amperage power to the pair of electrode blocks.

2 Claims, 7 Drawing Figures

ELECTRIC WORK-IN-CIRCUIT METAL-BONDING TONGS

BACKGROUND AND OBJECTS OF THE INVENTION

Electric work-in-circuit metal-bonding tongs are broadly old, e.g. U.S. Pat. No. 2,844,697 to Emmerson. But none is known to have (1) dove-tailed carbon-block electrodes for easy slide-in replacement in (2) tips which can be angularly oriented for operating in narrow spaces, (3) heat-dissipating fins between the electrode tips and their handles, and (4) an in-handle grip-operable low-amperage microswitch for controlling the primary circuit of (5) a power-limiting step-down transformer. It is the principal object of this invention to provide such a device. Other objects and advantages will become apparent as the following detailed description proceeds.

BRIEF DESCRIPTIONS OF THE DRAWING FIGURES

DETAILED DESCRIPTION

Figure 1:
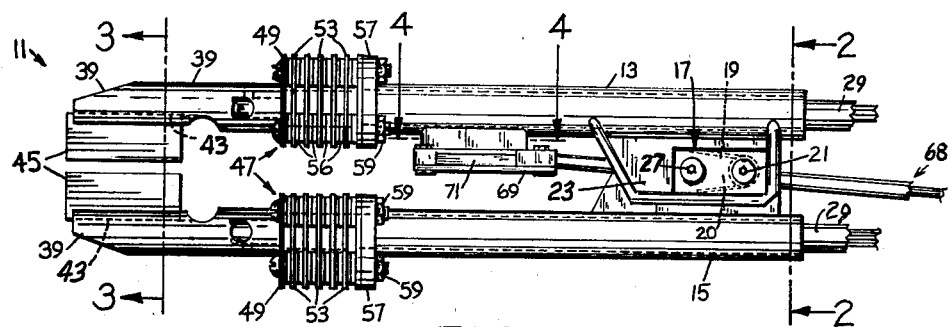
FIG. 1 is a side elevational view of a preferred embodiment of the tongs.

With reference now to the drawings, the numeral 11 generally designates a preferred embodiment of the tong assemblage which comprises basically an upper arm 13 and a lower arm 15 hingedly connected adjacent their rear ends by a hinge 17 and biased to open by a spring 19 looped in mating pockets 20 around the hinge pin 21.

Figure 2:
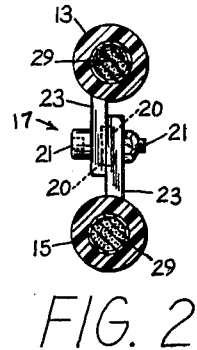
FIG. 2 is an end elevational view in section on line 2—2 of FIG. 1.

The arms 13 and 15 are preferably formed of a heat-resistant fiber-reinforced plastic material and the hinge 17 is formed of integral pocketed webs 23 (FIG. 2) on the rear ends of the arms 13 and 15. One of the webs 23 has an arcuate slot (not shown) which co-operates with a pin 27 to limit the opening movements of the two arms.

Figure 3:
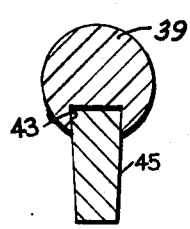
FIG. 3 is an enlarged elevational view of the upper electrode in section taken on the line 3—3 of FIG. 1.
Figure 5:
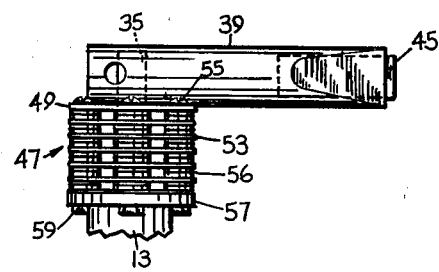
FIG. 5 is a fragmentary plan view showing the upper electrode attached at right angle to the upper tong member.

Each of the arms 13 and 15 has an axial bore therethrough to receive a heavy-duty (250-ampere) insulated stranded conductor 29, the front bared end 30 of which extends beyond the front end of the arm, and is clamped, as by set screws 31 (FIG. 7), in an axial bore in a cylindrical metallic body 33. Said body 33 has a reduced-diameter axial extension 35 which is received in an axial bore 37 in an electrode holder 39 and fastened therein by a set-screw 41. The electrode holder 39 also has a transverse bore 42 to receive the extension 35 for attaching the electrode holder transversely of the tongs 11, as shown in FIG. 5. The electrode holders 39 are each provided with a dove-tailed longitudinally extending socket 43 for slide-in reception of a tapered-cross-section carbon-type block 45 (FIG. 3) of known composition.

Figure 7:
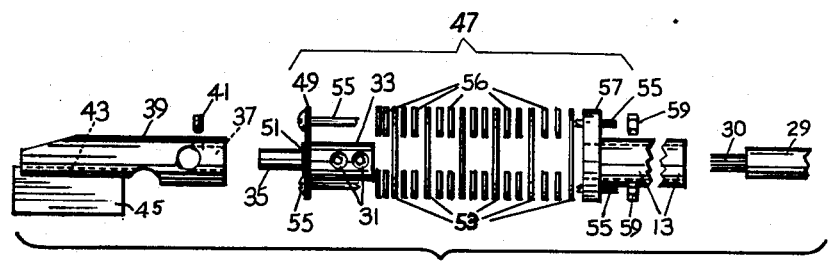
FIG. 7 is a fragmentary exploded view of the upper arm 13.

Each electrode holder 39 is rigidly connected to the front end of each arm 13 or 15 by a heat-dissipating unit 47, detailed in FIG. 7. Each unit 47 comprises a stainless-steel disc 49 medially apertured for press-fitting over an axially-short reduced-diameter circular rabbited seat 51 formed on the body 33. The disc 49 is firmly fixed on seat 51 and thus to the body 33 by peening or welding. The other discs 53 are aluminum for better heat-conductivity, and they are provided with larger medial apertures to clear the larger-diameter part of the body 33 and its partly extended allen screws 31 (for clamping thereto the bared end 30 of the conductor cable 29, as noted above). Each heat-dissipator 47 is assembled and is attached to the front end of the arm 13 or 15 by three bolts 55 which pass through discs 49 and 53, spacing aluminum washers 56 and through apertures in flange 57 molded integrally with its arm 13 or 15. Nuts 59 complete each heat-dissipator unit 47.

FIG. 5 shows how the electrodes can be oriented laterally of the arms, if desired, e.g. for operating in narrow spaces.

Figure 4:
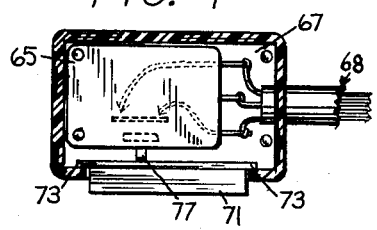
FIG. 4 is an enlarged plan view of the switch assemblage in section taken on the line 4—4 of FIG. 1.
Figure 6:
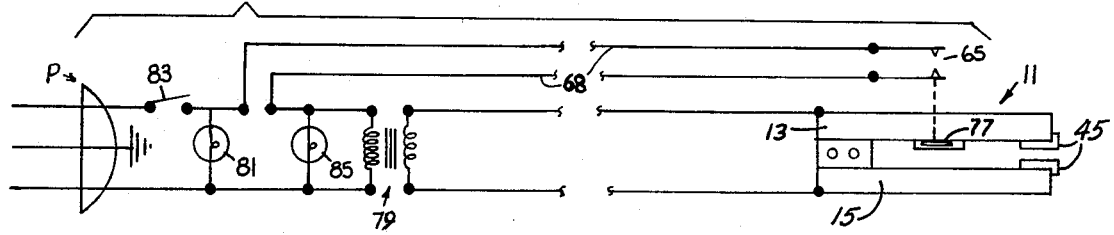
FIG. 6 is a schematic wiring diagram of the circuit to be employed.

A normally open microswitch 65 (FIG. 4) is seated in a shallow pocket 67 in the lower surface of the upper arm 13 and is held therein by a removable plate 69. A movable bar 71 is retained in the pocket 67 by its marginal beads 73 received in surrounding grooves in the pocket periphery. Pressure, as from the thumb of a hand gripping the tool, against the bar 71 presses it against the button 77 of the switch 65 to close through cable 68 (FIGS. 1, 4 and 6) the circuit to the primary of the step-down transformer 79 (FIG. 6) to energize the tool 11 (e.g. at seven volts and 375 amperes, built-in maximum). A green lamp 81 (FIG. 6) shows that the primary circuit has been energized by the master manual switch 83. When the tool-mounted switch 65 is closed, a red light 85 will glow to indicate that soldering, brazing or welding power is connected to the step-down transformer 79 and will flow between the electrodes 45 when clamped upon a conductive work piece.

The invention having been described, what is claimed is:

1. A low-voltage high-amperage tong-type portable work-in-circuit metal-bonding device, comprising: a pair of elongated electrically-insulated arms each having a front end and a rear end, said arms being hingedly connected adjacent their rear ends, an electric power supply conductor extending through and beyond the front end of each arm, an elongated metallic body detachably fixed at one end to the extended end of each conductor, a metallic electrode-holder detachably fixed to the other end of each metallic body, an elongated transversely tapered carbon electrode block attached to each electrode holder by sliding engagement in a dovetail groove in each electrode holder, and an open-work heat-dissipating unit surrounding and spaced from the rear portion of said metallic body and rigidly connected at one end to the mid-portion of the conductor body and at its other end to the front end of each arm, the front end of each metallic body having a reduced-diameter portion and said metallic electrode holders having a longitudinal and a transverse bore to selectively receive said reduced-diameter portion, whereby said electrode block can be oriented either longitudinally or transversely of the front end of said arm.

2. A device according to claim 1 wherein each heat-dissipating member comprises a plurality of parallel metal discs spaced by washers at least most of which are metallic.

* * * * *